US012639403B2

(12) United States Patent
Gollapudi et al.

(10) Patent No.: US 12,639,403 B2
(45) Date of Patent: May 26, 2026

(54) TESTING AND BASELINING A MACHINE LEARNING MODEL AND TEST DATA

(71) Applicant: Juniper Networks, Inc., Sunnyvale, CA (US)

(72) Inventors: Sarath Gollapudi, Bangalore (IN); Pooja Sambhaji Ayanile, Latur (IN); Sabyasachi Mukhopadhyay, Bangalore (IN); Sanjeev Kumar Mishra, Bangalore (IN); Rakshith N, Puttur (IN); Subhabrata Banerjee, Bangalore (IN); Darshan Tirumale Dhanaraj, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 906 days.

(21) Appl. No.: 17/901,261

(22) Filed: Sep. 1, 2022

(65) Prior Publication Data
US 2024/0078289 A1 Mar. 7, 2024

(51) Int. Cl.
*G06F 18/21* (2023.01)
*G06N 20/00* (2019.01)

(52) U.S. Cl.
CPC ......... *G06F 18/2193* (2023.01); *G06N 20/00* (2019.01)

(58) Field of Classification Search
CPC .... G06N 20/00; G06F 18/2193; G06F 18/217
USPC .......................................................... 706/12
See application file for complete search history.

(56) References Cited

U.S. PATENT DOCUMENTS

| | | | |
|---|---|---|---|
| 10,719,301 B1 * | 7/2020 | Dasgupta | G06F 8/33 |
| 10,747,651 B1 * | 8/2020 | Vanderwall | G06F 11/3684 |
| 11,397,658 B1 * | 7/2022 | Pang | G06F 11/3433 |
| 2018/0300499 A1 * | 10/2018 | Agarwal | H04L 63/0428 |
| 2018/0307582 A1 * | 10/2018 | Vikjord | G06N 7/01 |
| 2019/0158439 A1 * | 5/2019 | Tetreault | H04L 51/046 |
| 2021/0097431 A1 * | 4/2021 | Olgiati | G06N 5/046 |
| 2021/0097433 A1 | 4/2021 | Olgiati et al. | |

(Continued)

OTHER PUBLICATIONS

Lwakatare et al., "On the Experiences of Adopting Automated Data Validation in an Industrial Machine Learning Project", 2021 IEEE/ACM 43rd International Conference on Software Engineering: Software Engineering in Practice (ICSE-SEIP), May 2021, pp. 248-257. (Year: 2021).*

(Continued)

*Primary Examiner* — Hwei-Min Lu
(74) *Attorney, Agent, or Firm* — Juniper Networks, Inc.

(57) ABSTRACT
A device may receive a machine learning model, training data, and test data, and may perform a unit test on the machine learning model to generate unit test results. The device may perform regression tests on the machine learning model, with the training data and the test data, to calculate model scores, create graphs, determine inference delays, and identify missing points for the machine learning model. The device may perform scale and longevity tests on the machine learning model, with the training data and the test data, to identify additional missing points and calculate a resource utilization for the machine learning model. The device may update the machine learning model, to generate an updated machine learning model, based on the unit test results, the model scores, the graphs, the inference delays, the missing points, the additional missing points, or the resource utilization.

20 Claims, 12 Drawing Sheets

(56)                   References Cited

U.S. PATENT DOCUMENTS

| | | | | |
|---|---|---|---|---|
| 2021/0182693 | A1* | 6/2021 | Herlocker | G06N 3/09 |
| 2021/0287109 | A1* | 9/2021 | Cmielowski | G06N 20/00 |
| 2021/0319333 | A1 | 10/2021 | Lee et al. | |
| 2022/0083445 | A1 | 3/2022 | Nyati et al. | |
| 2022/0198340 | A1* | 6/2022 | Gao | G06F 11/3688 |
| 2022/0245060 | A1* | 8/2022 | Kathuria | G06F 11/3688 |
| 2022/0309391 | A1* | 9/2022 | Patel | G06F 8/34 |
| 2022/0414539 | A1* | 12/2022 | Oren | G06F 11/3447 |
| 2023/0229735 | A1* | 7/2023 | Jain | G06F 18/2148 |
| | | | | 706/12 |

OTHER PUBLICATIONS

Zhang et al., "Machine Learning Testing: Survey, Landscapes and Horizons", IEEE Transactions on Software Engineering, vol. 48, No. 1, Jan. 2022, pp. 1-36. (Year: 2022).*

Van Oort et al., ""Project smells"—Experiences in Analysing the Software Quality of ML Projects with mllint", 2022 IEEE/ACM 44th International Conference on Software Engineering: Software Engineering in Practice (ICSE-SEIP), May 2022, pp. 211-220. (Year: 2022).*

Fontes et al., "The Integration of Machine Learning into Automated Test Generation: A Systematic Mapping Study", ARXIV ID: 2206. 10210, Jun. 21, 2022, pp. 1-83. (Year: 2022).*

Li et al., "Sectum: Accurate Latency Prediction for TEE-hosted Deep Learning Inference", 2022 IEEE 42nd International Conference on Distributed Computing Systems (ICDCS), Jul. 2022, pp. 906-916. (Year: 2022).*

Extended European Search Report for Application No. EP22205109, mailed on Oct. 30, 2023, 19 Pages.

Zhang et al., "Machine Learning Testing: Survey, Landscapes and Horizons," Website: https://arxiv.org/pdf/1906.10742.pdf, Dec. 21, 2019, 37 Pages.

"The Data Linter: Lightweight, Automated Sanity Checking for ML Data Sets," Website: https://github.com/brain-research/data-linter, Obtained Sep. 1, 2022; 4 Pages.

Brownlee, "How to Check if Time Series Data is Stationary with Python," Website: https://machinelearningmastery.com/time-series-data-stationary-python, Aug. 15, 2020, 59 Pages.

Ammann et al., "Introduction to software testing," Cambridge University Press, 2016, 473 Pages.

Halim et al., "Automatic seasonal auto regressive moving average models and unit root test detection," International Journal of Management Science and Engineering Management, vol. 3, No. 4, pp. 266-274, Mar. 1, 2008.

* cited by examiner

100

110
Store the historical validated data as training data and the real time data as test data Testing system

105
Receive a machine learning model, historical validated test data, and real time data User device

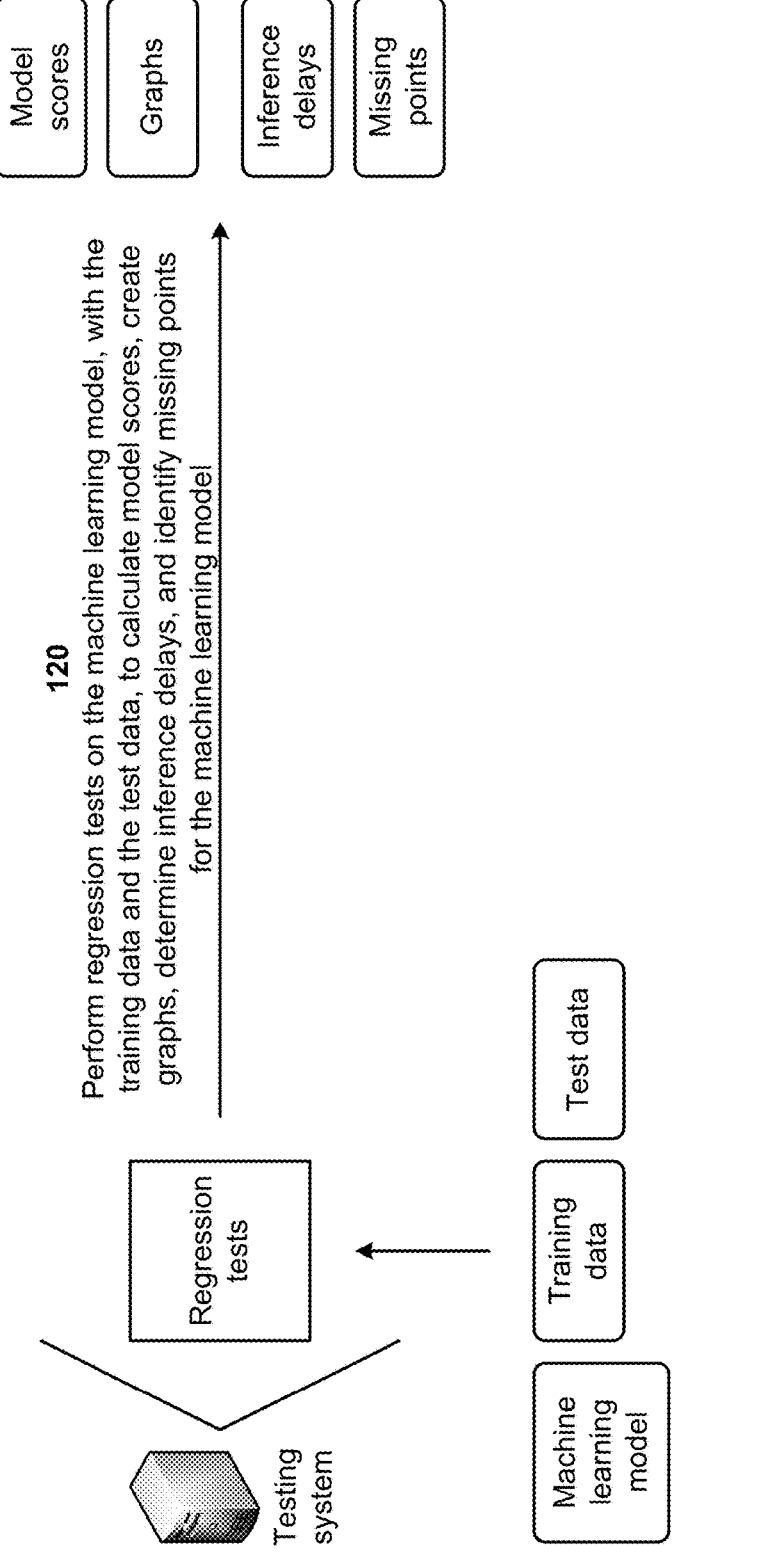

120

Perform regression tests on the machine learning model, with the training data and the test data, to calculate model scores, create graphs, determine inference delays, and identify missing points for the machine learning model Model scores Graphs Inference delays Missing points Regression tests Testing system Test data Training data Machine learning model

125
Perform scale and longevity tests on the machine learning model, with the training data and the test data, to identify additional missing points and calculate a resource utilization for the machine learning model Additional missing points Resource utilization Scale and longevity tests Testing system Test data Training data Machine learning model

100

130

Update the machine learning model based on one or more of the unit test results, the model scores, the graphs, the inference delays, the missing points, the additional missing points, or the resource utilization

145
Calculate test data scores for the test data based on parameters and properties associated with the training data and the test data

150
Update the training data with the test data based on the test data scores satisfying a score threshold

155

Analyze and correct the test data to generate corrected test data based on the test data scores failing to satisfy the score threshold Corrected test data

160

Update the training data with the corrected test data

Updated training data

Correct test data

Test data

Test data scores

Testing system

100

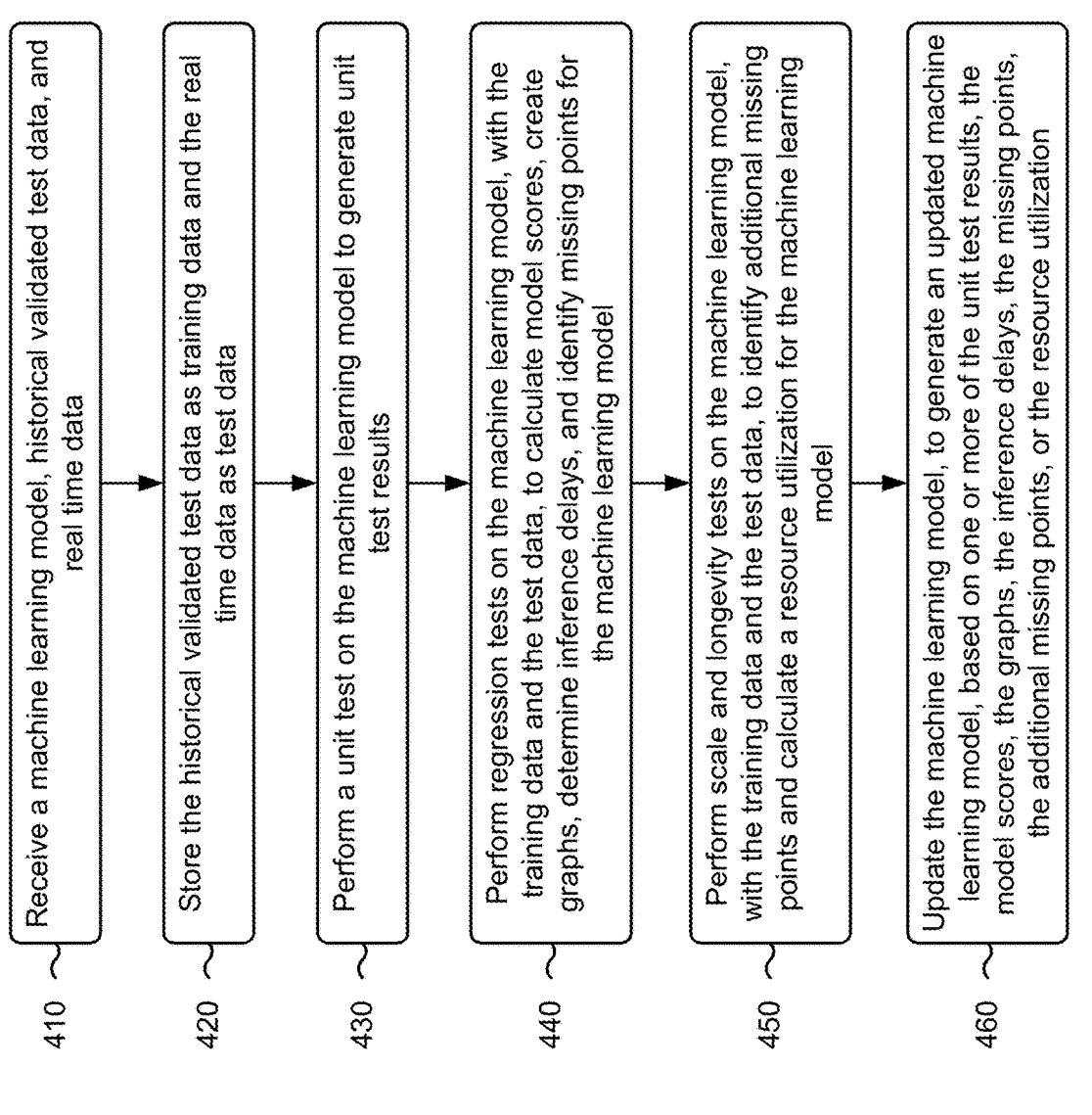

410 Receive a machine learning model, historical validated test data, and real time data 420 Store the historical validated test data as training data and the real time data as test data 430 Perform a unit test on the machine learning model to generate unit test results 440 Perform regression tests on the machine learning model, with the training data and the test data, to calculate model scores, create graphs, determine inference delays, and identify missing points for the machine learning model 450 Perform scale and longevity tests on the machine learning model, with the training data and the test data, to identify additional missing points and calculate a resource utilization for the machine learning model 460 Update the machine learning model, to generate an updated machine learning model, based on one or more of the unit test results, the model scores, the graphs, the inference delays, the missing points, the additional missing points, or the resource utilization

TESTING AND BASELINING A MACHINE LEARNING MODEL AND TEST DATA

BACKGROUND

A machine learning model is a model that determines patterns or makes decisions based on a previously unseen dataset. For example, in natural language processing, a machine learning model may parse and correctly recognize an intent behind previously unheard sentences or combinations of words.

SUMMARY

Some implementations described herein relate to a method. The method may include receiving a machine learning model, historical validated test data, and real time data, and storing the historical validated test data as training data and the real time data as test data. The method may include performing a unit test on the machine learning model to generate unit test results, and performing regression tests on the machine learning model, with the training data and the test data, to calculate model scores, create graphs, determine inference delays, and identify missing points for the machine learning model. The method may include performing scale and longevity tests on the machine learning model, with the training data and the test data, to identify additional missing points and calculate a resource utilization for the machine learning model. The method may include updating the machine learning model, to generate an updated machine learning model, based on one or more of the unit test results, the model scores, the graphs, the inference delays, the missing points, the additional missing points, or the resource utilization.

Some implementations described herein relate to a device. The device may include one or more memories and one or more processors. The one or more processors may be configured to receive a machine learning model, historical validated test data, and real time data, and store the historical validated test data as training data and the real time data as test data. The one or more processors may be configured to perform a unit test on the machine learning model to generate unit test results, and perform regression tests on the machine learning model, with the training data and the test data, to calculate model scores, create graphs, determine inference delays, and identify missing points for the machine learning model. The one or more processors may be configured to perform scale and longevity tests on the machine learning model, with the training data and the test data, to identify additional missing points and calculate a resource utilization for the machine learning model, and update the machine learning model, to generate an updated machine learning model, based on one or more of the unit test results, the model scores, the graphs, the inference delays, the missing points, the additional missing points, or the resource utilization. The one or more processors may be configured to calculate test data scores for the test data based on parameters and properties associated with the training data and the test data, and update the training data with the test data based on the test data scores satisfying a score threshold.

Some implementations described herein relate to a non-transitory computer-readable medium that stores a set of instructions for a device. The set of instructions, when executed by one or more processors of the device, may cause the device to receive a machine learning model, historical validated test data, and real time data, and store the historical validated test data as training data and the real time data as test data. The set of instructions, when executed by one or more processors of the device, may cause the device to perform a unit test on the machine learning model to generate unit test results, and perform regression tests on the machine learning model, with the training data and the test data, to calculate model scores, create graphs, determine inference delays, and identify missing points for the machine learning model. The set of instructions, when executed by one or more processors of the device, may cause the device to perform scale and longevity tests on the machine learning model, with the training data and the test data, to identify additional missing points and calculate a resource utilization for the machine learning model, and update the machine learning model, to generate an updated machine learning model, based on one or more of the unit test results, the model scores, the graphs, the inference delays, the missing points, the additional missing points, or the resource utilization. The set of instructions, when executed by one or more processors of the device, may cause the device to process the training data, with a static analysis model, to identify miscoding errors and outliers, and correct the training data to eliminate the miscoding errors and the outliers.

BRIEF DESCRIPTION OF THE DRAWINGS

FIGS. 1A-1I are diagrams of an example associated with testing and baselining a machine learning model and test data.

FIG. 4 is a flowchart of an example process for testing and baselining a machine learning model and test data.

DETAILED DESCRIPTION

Figure 1A:
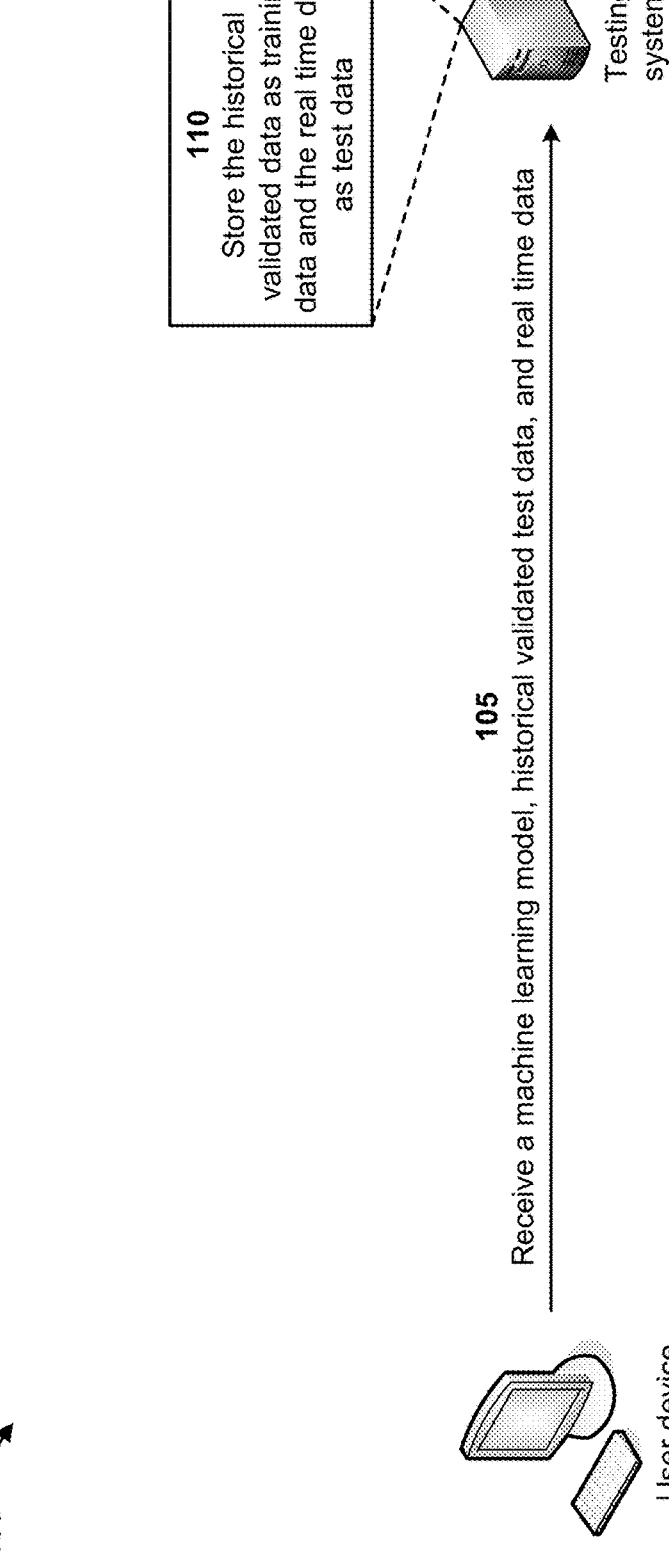

The following detailed description of example implementations refers to the accompanying drawings. The same reference numbers in different drawings may identify the same or similar elements.

As a machine learning model evolves and improves, users of the machine learning model need to ensure that an efficiency and a performance of the machine learning model do not degrade. Testing a machine learning model differs from testing regular software. In software testing, an output is well defined and a core behavior of the software does not change. In machine learning model testing, an output is unknown and a core behavior of the machine learning model changes. For example, as new data is provided to the machine learning model, the core behavior and baseline norms of the machine learning model may vary. An additional challenge of testing a machine learning model is a lack of validated test data and an extensive range of test data. Thus, current techniques for testing a machine learning model consume computing resources (e.g., processing resources, memory resources, communication resources, and/or the like), networking resources, and/or the like, associated with incorrectly training and testing an incorrect machine learning model, utilizing incorrect test data when testing a machine learning model, generating an incorrect machine learning model based on incorrectly testing the machine learning model, generating incorrect predictions with the incorrect machine learning model and performing actions based on the incorrect predictions, and/or the like.

Some implementations described herein relate to a testing system that tests and baselines a machine learning model and test data. For example, the testing system may receive a machine learning model, historical validated test data, and real time data, and may store the historical validated test data as training data and the real time data as test data. The testing system may perform a unit test on the machine learning model to generate unit test results, and may perform regression tests on the machine learning model, with the training data and the test data, to calculate model scores, create graphs, determine inference delays, and identify missing points for the machine learning model. The testing system may perform scale and longevity tests on the machine learning model, with the training data and the test data, to identify additional missing points and calculate a resource utilization for the machine learning model, and may update the machine learning model, to generate an updated machine learning model, based on one or more of the unit test results, the model scores, the graphs, the inference delays, the missing points, the additional missing points, or the resource utilization. The testing system may calculate test data scores for the test data based on parameters and properties associated with the training data and the test data, and may update the training data with the test data based on the test data scores satisfying a score threshold.

In this way, the testing system may test and baseline a machine learning model and test data. For example, the testing system may consider variances of input data for the machine learning model to ensure that an updated machine learning model functions correctly. The testing system may utilize various metrics and a testing approach that relies on the metrics to validate an efficiency of the updated machine learning model compared to a prior version of the machine learning model. The testing system may also score test data, utilized to test and train the updated machine learning model, to ensure that the test data is correct. Thus, the testing system conserves computing resources, networking resources, and/or the like that would otherwise have been consumed by incorrectly training and testing an incorrect machine learning model, utilizing incorrect test data when testing a machine learning model, generating an incorrect machine learning model based on incorrectly testing the machine learning model, generating incorrect predictions with the incorrect machine learning model and performing actions based on the incorrect predictions, and/or the like.

FIGS. 1A-1I are diagrams of an example 100 associated with testing and baselining a machine learning model and test data. As shown in FIGS. 1A-1I, example 100 includes a testing system associated with a user device. The testing system may include a system that tests and baselines a machine learning model and test data. Further details of the testing system and the user device are provided elsewhere herein.

As shown in FIG. 1A, and by reference number 105, the testing system may receive a machine learning model, historical validated test data, and real time data. For example, the testing system may receive the machine learning model, the historical validated test data, and the real time data from the user device. In some implementations, the testing system may receive the machine learning model, the historical validated test data, and the real time data from a source other than the user device, such as from a server device, a data structure (e.g., a database, a table, a list, and/or the like), and/or the like. In some implementations, the testing system may receive and/or store the machine learning model and the historical validated test data prior to receiving the real time data. For example, the testing system may store the machine learning model in a data structure associated with the test system and may generate the historical validated test data based on historical tests of the machine learning model. The testing system may store the historical validated test data in the data structure. In some implementations, the testing system may continuously receive the real time data from the user device, may periodically receive the real time data from the user device, may receive the real time data from the user device based on providing a request for the real time data to the user device, and/or the like.

The machine learning model may include a model that determines patterns or makes decisions based on a previously unseen dataset (e.g., a dataset not previously seen by the model). For example, the machine learning model may include a classification machine learning model, a regression machine learning model, a clustering machine learning model, and/or the like. The historical validated test data may include refined historical test data that is utilized by the testing system to test the machine learning model and generate results that satisfy a threshold (e.g., that validate the machine learning model). The real time data may include data generated in real time by a system (e.g., a network of network devices), data to be utilized by the machine learning model to make predictions in real time, and/or the like.

As further shown in FIG. 1A, and by reference number 110, the testing system may store the historical validated test data as training data and store the real time data as test data. For example, the testing system may store (e.g., in a data structure associated with the testing system) the historical validated test data as training data for training the machine learning model, and may store the real time data as test data for testing the trained machine learning model. In some implementations, the training data may include data that is processed by the machine learning model so that the machine learning model may discover and learn patterns (e.g., data that trains the machine learning model). In some implementations, the test data may include data that is utilized by the testing system to evaluate a performance and/or progress of the training of the machine learning model and to adjust and/or optimize the machine learning model for improved results.

Figure 1B:
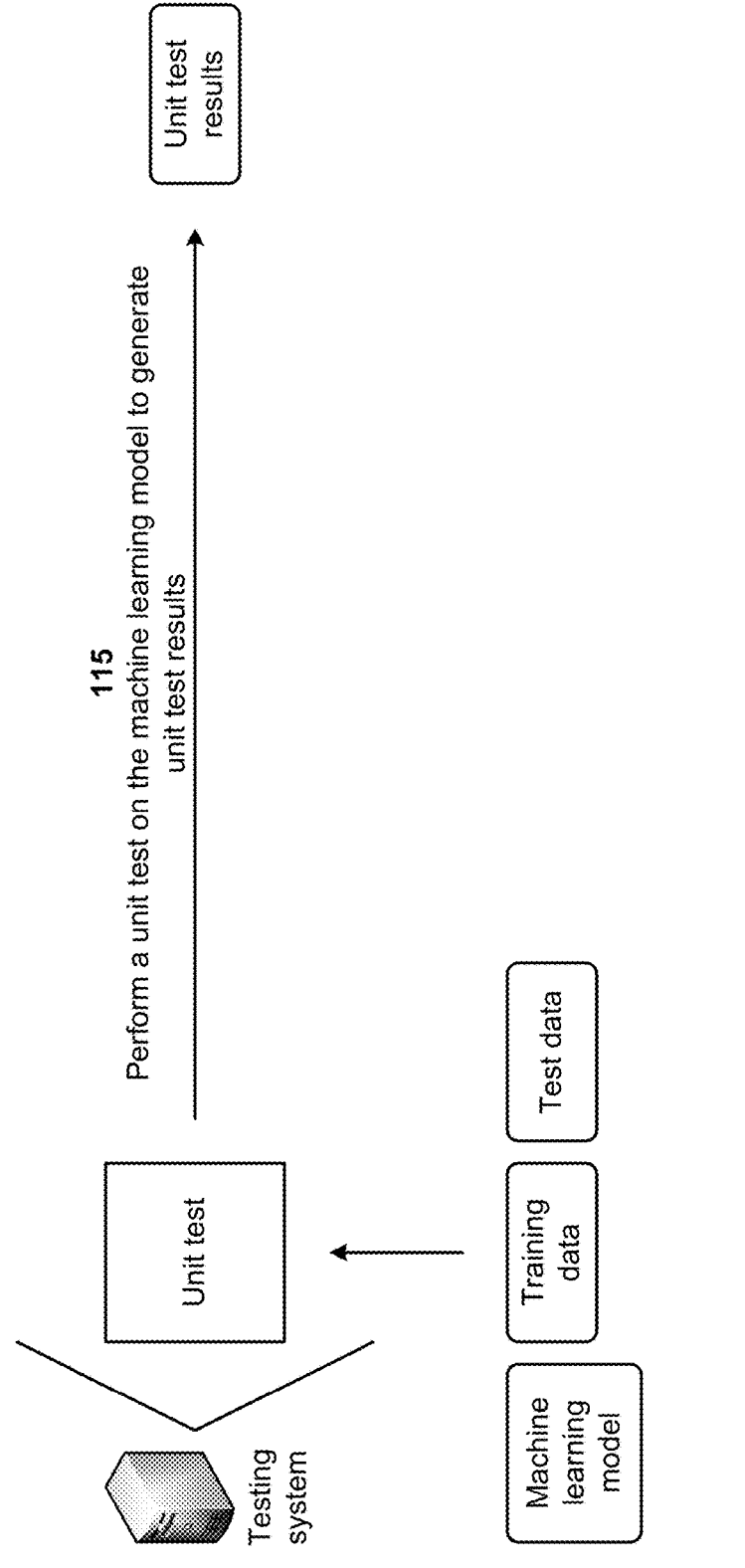

As shown in FIG. 1B, and by reference number 115, the testing system may perform a unit test on the machine learning model to generate unit test results. For example, a unit test may be a software development process in which smallest testable portions of the machine learning model (e.g., called units) are individually and independently scrutinized for proper operation. A main objective of a unit test is to isolate code to test and to determine if the code works as intended. If performed correctly, a unit test may enable early detection of flaws in code, which may be more difficult to identify in later testing stages. The testing system may generate the unit test with a unit test framework, and may perform the unit test on the machine learning model to generate the unit test results. The unit test results may include data identifying that the machine learning model passed the unit test, that the machine learning model failed the unit test, errors or bugs in the machine learning model, a location of a fault or a failure in the machine learning model, and/or the like. In some implementations, the unit test may test an infrastructure of the machine learning model, may ensure sufficient line coverage (e.g., line coverage is a software testing metric that determines a quantity of lines of code that is successfully validated under a test procedure, which in turn, helps in analyzing how comprehensively software is verified) of the machine learning model code, and/or the like.

As shown in FIG. 1C, and by reference number 120, the testing system may perform regression tests on the machine learning model, with the training data and the test data, to calculate model scores, create graphs, determine inference delays, and identify missing points for the machine learning model. For example, the testing system may perform regression tests on the machine learning model, with both the training data and the test data, to generate results for validating an efficiency of the machine learning model. In some implementations, the results may include the model scores, which may be calculated for the machine learning model and may be compared to previous model scores for previous versions of the machine learning model. The testing system may compare the calculated model scores and the previous model scores to determine whether a reduction occurred in the calculated model scores from the previous model scores. In some implementations, a reduction in the calculated model scores from the previous model scores may result in a failure of a regression test of the machine learning model.

In some implementations, the model scores may include a mean absolute percentage error (MAPE) a symmetric MAPE (SHAPE), and/or other model scores that depend on a type associated with the machine learning model, the training data, and/or the test data. A MAPE may be calculated as follows:

$$MAPE = \frac{1}{n}\sum_{t=1}^{n}\left|\frac{A_t - F_t}{A_t}\right|,$$

where $A_t$ is an actual value, $F_t$ is a forecast or predicted value, and n is a quantity of fitted points. A SMAPE may be calculated as follows:

$$SMAPE = \frac{1}{n}\sum_{t=1}^{n}\left|\frac{A_t - F_t}{\frac{|A_t| + |F_t|}{2}}\right|.$$

In some implementations, the testing system may split inputs and outputs of the machine learning model into blocks, and may calculate a MAPE and a SMAPE for each of the blocks. Splitting the inputs and the outputs of the machine learning model into blocks may enable the testing system to identify blocks of the input and the output that are most affected.

In some implementations, the testing system may automatically create the graphs for predicted values and actual values associated with the machine learning model. The testing system may validate the graphs and/or may store the graphs for validation by subject matter experts. The inference delays for the machine learning model may include a quantity of time required for the machine learning mode to generate inferences. The testing system may determine the inference delays since such delays may affect a customer experience with the machine learning model. A machine learning model that has minimal inference delays may provide a good customer experience with the machine learning model.

The testing system may identify the missing points when the machine learning model processes the test data. A machine learning model may need to be resilient to large data loads and missing input data. In some implementations, the missing points may provide an indication of a quantity of inferences that the machine learning model failed to generate. In an ideal case, the quantity of inferences may be zero. A quantity of inferences greater than zero may indicate an issue with an inferencing process of the machine learning model.

Figure 1D:
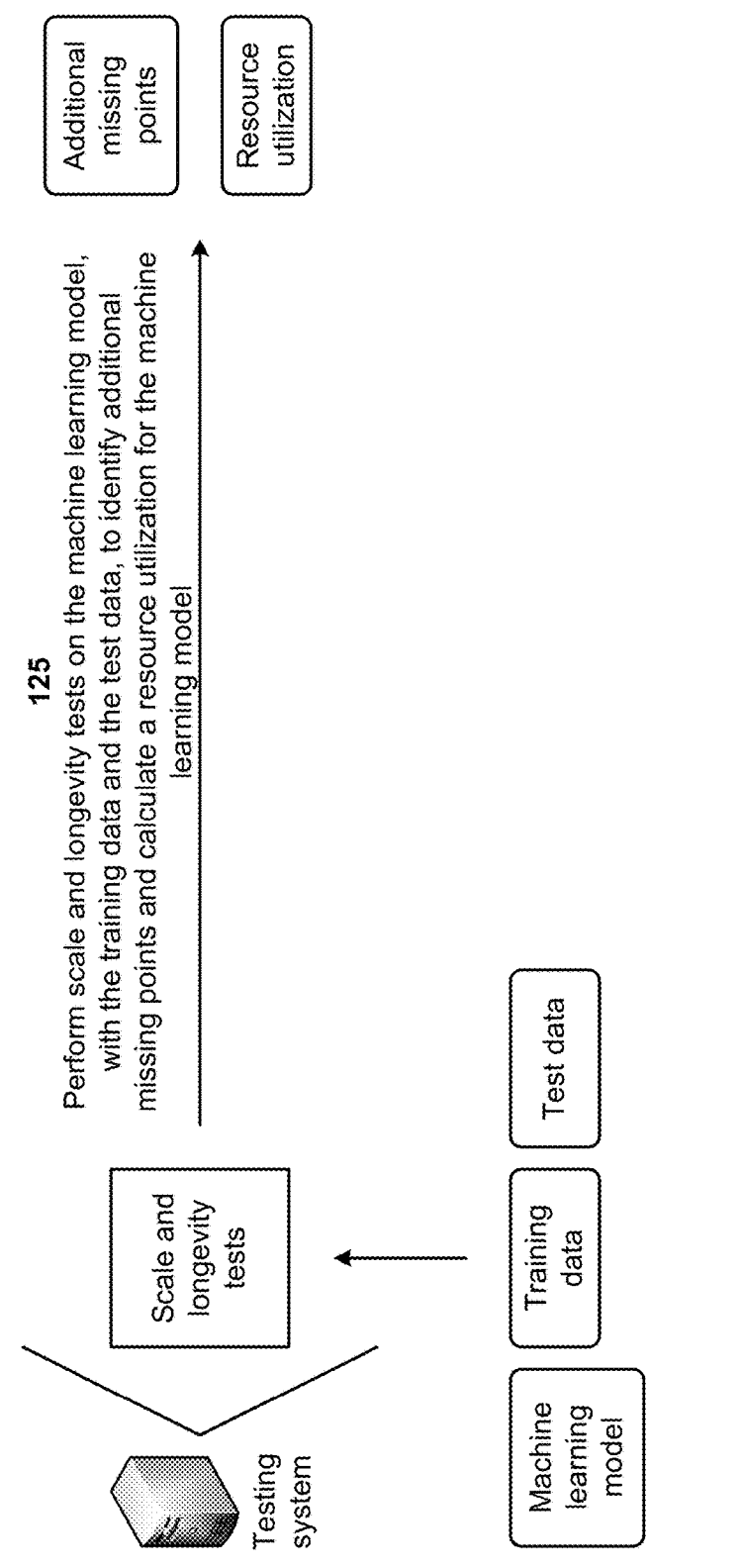

As shown in FIG. 1D, and by reference number 125, the testing system may perform scale and longevity tests on the machine learning model, with the training data and the test data, to identify additional missing points and calculate a resource utilization for the machine learning model. For example, after performing the regression tests, the testing system may perform the scale and longevity tests on the machine learning model, with both the training data and the test data, to generate results. When performing the scale tests, the testing system may determine a maximum capacity of the machine learning model and benchmarks associated with the maximum capacity. The testing system may compare the benchmarks with previous benchmarks for previous versions of the machine learning model. The testing system may compare the benchmarks and the previous benchmarks to determine whether a reduction occurs in the benchmarks from the previous benchmarks. In some implementations, a reduction in the benchmarks from the previous benchmarks may result in a failure of a scale test of the machine learning model.

When performing the longevity tests on the machine learning model, the testing system may determine the additional missing points. In some implementations, the additional missing points may provide an indication of a quantity of inferences that the machine learning model failed to generate. In an ideal case, the quantity of inferences may be zero. A quantity of inferences greater than zero may indicate an issue with an inferencing process of the machine learning model.

In some implementations, when performing the longevity tests on the machine learning model, the testing system may calculate the resource utilization for the machine learning model. The resource utilization may provide an indication of a processor utilization and a memory utilization when the machine learning model is executed. For example, the testing system may collect (e.g., over time) the processor utilization and the memory utilization when the machine learning model is executed, and may generate a graph indicating the processor utilization and the memory utilization. The testing system may utilize the graph to determine whether the machine learning model is causing memory leaks and/or is overutilizing the processor and/or the memory.

Figure 1E:
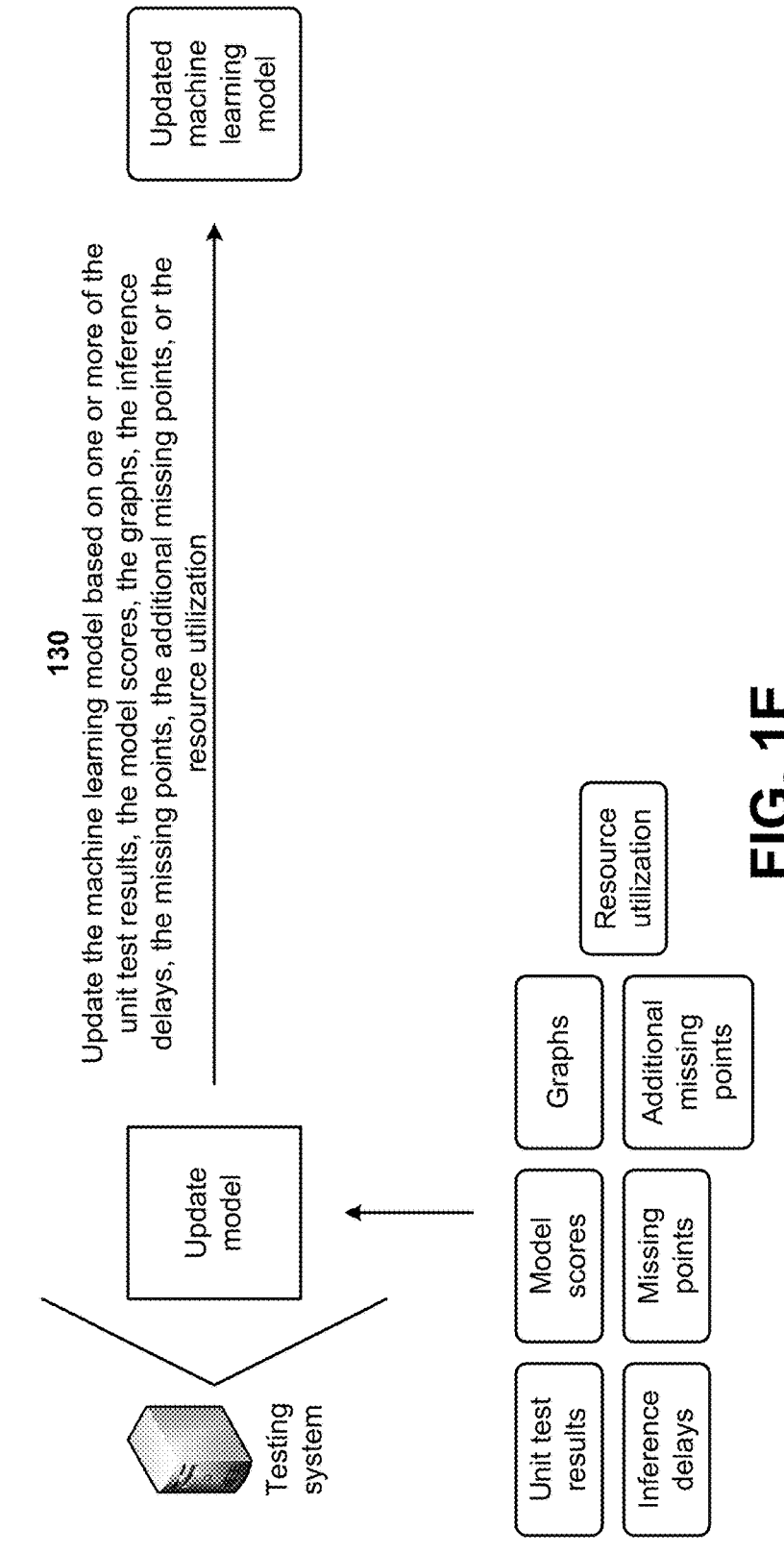

As shown in FIG. 1E, and by reference number 130, the testing system may update the machine learning model (e.g., to generate an updated machine learning model) based on one or more of the unit test results, the model scores, the graphs, the inference delays, the missing points, the additional missing points, or the resource utilization. For example, if the unit test results identify errors or bugs in the machine learning model or a location of a fault or a failure in the machine learning model, the testing system may update the machine learning model to correct the errors or the bugs, to correct the fault or the failure, and/or the like. In some implementations, if the testing system identifies a reduction in the calculated model scores from the previous model scores, the testing system may update the machine learning model to eliminate or minimize the reduction in the calculated model scores from the previous model scores.

In some implementations, if the testing system fails to validate the graphs for the predicted values and the actual values associated with the machine learning model, the testing system may update the machine learning model until the testing system validates the graphs for the predicted values and the actual values. If the testing system determines that the inference delays for the machine learning model fail to satisfy a delay threshold, the testing system may update the machine learning model until the inference delays for the machine learning model satisfy the delay threshold.

In some implementations, if the testing system determines that the quantity of missing points (e.g., the quantity of inferences that the machine learning model failed to generate) is greater than zero, the testing system may update the inferencing process of the machine learning model until the quantity of missing points is zero. Alternatively, or additionally, if the testing system determines that the quantity of additional missing points (e.g., the quantity of inferences that the machine learning model failed to generate) is greater than zero, the testing system may update the inferencing process of the machine learning model until the quantity of additional missing points is zero.

In some implementations, the testing system may determine that the graph indicating the processor utilization and the memory utilization by the machine learning model indicates that the machine learning model is causing memory leaks and/or is overutilizing the processor and/or the memory. In such implementations, the testing system may update the machine learning model to eliminate or minimize the memory leaks and/or the overutilization of the processor and/or the memory caused by the machine learning model.

Figure 1F:
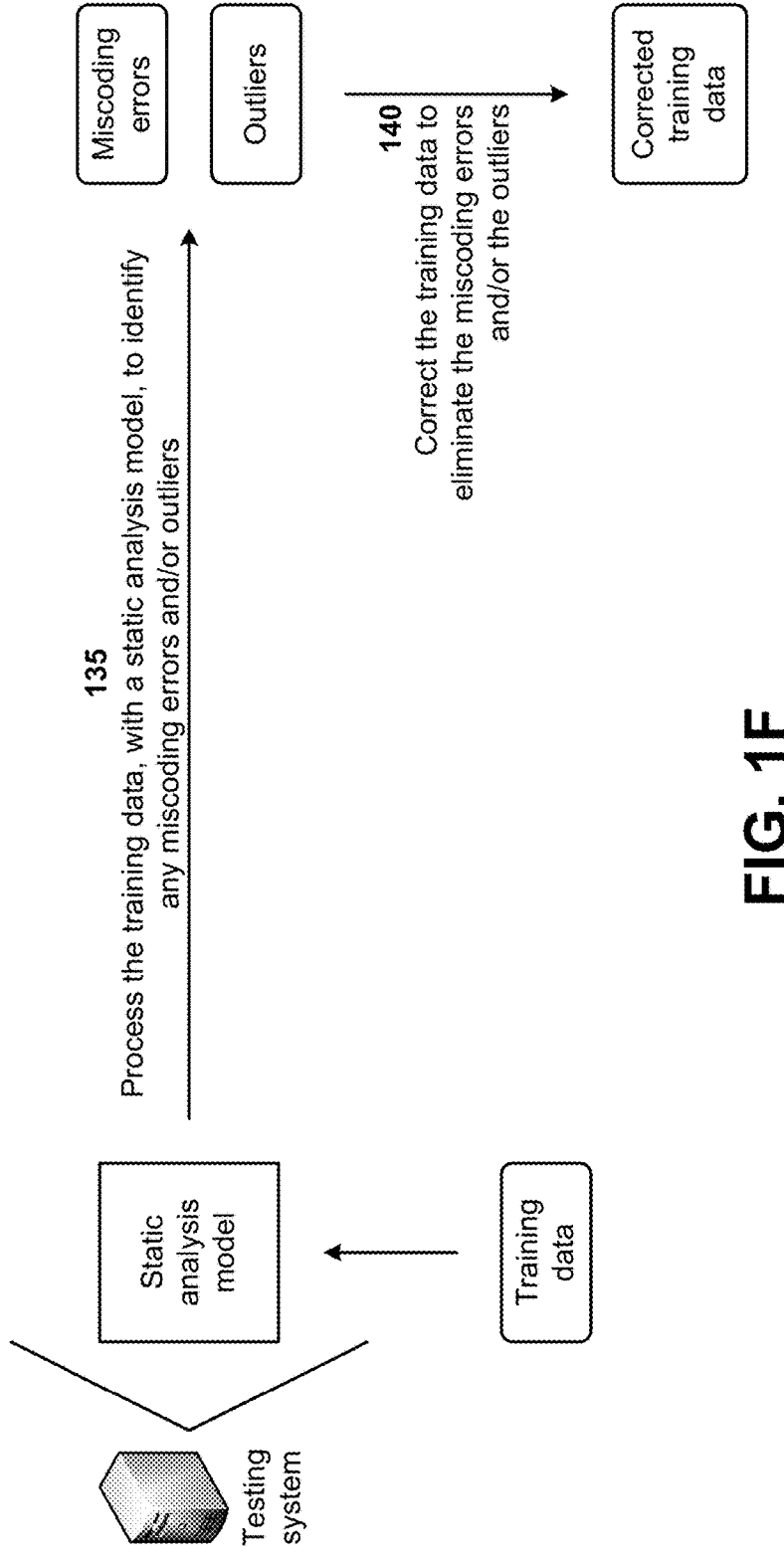

As shown in FIG. 1F, and by reference number 135, the testing system may process the training data, with a static analysis model, to identify any miscoding errors and/or outliers. For example, the training data may affect an accuracy of testing the machine learning model. The static analysis model may include a model that analyzes and tests the training data without executing the machine learning model. In some implementations, the static analysis model may include a data lint model that identifies any miscoding errors (e.g., programming errors, bugs, stylistic errors, suspicious constructs, and/or the like) and/or outliers associated with the training data. Thus, the testing system may utilize the static analysis model to identify any miscoding errors and/or outliers associated with the training data.

As further shown in FIG. 1F, and by reference number 140, the testing system may correct the training data to eliminate the miscoding errors and/or the outliers. For example, if the static analysis model identifies one or more miscoding errors and/or one or more outliers associated with the training, the testing system may correct the training data to eliminate the one or more miscoding errors and/or the one or more outliers. In some implementations, when correcting miscoding errors associated with the training data, the testing system may remove errors in the training data, may remove bugs in the training data, may correct stylistic errors in the training data, may remove suspicious constructs from the training data, and/or the like. In some implementations, when correcting outliers associated with the training data, the testing system may remove the outliers from the training data.

Figure 1G:
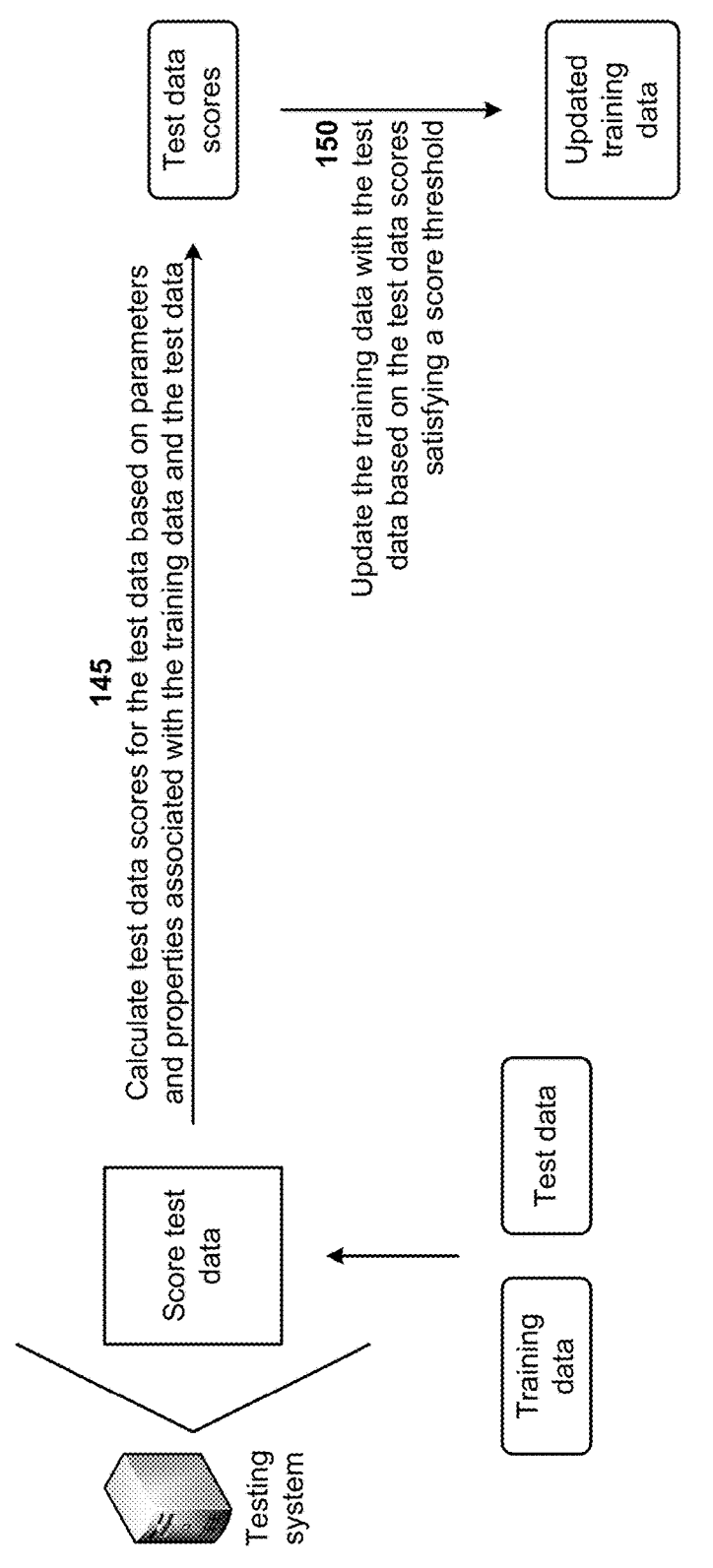

As shown in FIG. 1G, and by reference number 145, the testing system may calculate test data scores for the test data based on parameters and properties associated with the training data and the test data. For example, the test data may affect an accuracy of testing the machine learning model. If the machine learning model is more efficient when processing the training data than when processing the test data, the testing system may analyze the test data to determine whether the reduced efficiency of the machine learning model is caused by the test data or the machine learning model. If the testing system determines that the reduced efficiency of the machine learning model is caused by the machine learning model, the testing system may update the machine learning model to address the reduced efficiency. If the testing system determines that the reduced efficiency of the machine learning model is caused by the test data, the testing system may calculate the test data scores for the test data based on the parameters and the properties associated with the training data and the test data.

In some implementations, the testing system may determine parameters identifying a quantity of the training data and a quantity of the test data. The quantity of the test data may need to be greater than the quantity of the training data (e.g., by a predetermined threshold). If the testing system determines that the quantity of the test data is greater than the quantity of the training data, the testing system may analyze properties of the test data. For example, the testing system may determine whether the test data includes stagnant data. Stagnant data may include data with a minimal change in a data rate (e.g., an increasing data rate, a decreasing rate, a null trend data rate, and/or the like). Stagnant data may not completely validate the machine learning model. Thus, the testing system may check for stagnant data by dividing the test data into portions (e.g., ten portions, fifteen portions, and/or the like) and calculating differences between means of the portions. If there are no differences between the means of each portion, the testing system may determine that the test data includes stagnant data.

Data spikes may provide for a better analysis of the machine learning model. The testing system may check for data spikes by dividing the test data into portions and calculating means of the portions. If a trend of the means of the portions reverses at any point, the testing system may determine that the test data includes data spikes.

In some implementations, the testing system may process the test data with an augmented Dickey-Fuller model to identify details associated with the test data. The augmented Dickey-Fuller model may include a model that determines a null hypothesis that a unit root is present in a time series sample (e.g., the test data). In one example, the testing system may process the test data with the augmented Dickey-Fuller model as follows:

```
from statsmodels.tsa.stattools import adfuller
data_frame = read_csv('<filename>.csv')
model_data = data_frame['<COLUMN> ']
model_values = model_data.values
adfuller_result = adfuller(model_values)
print('ADF Statistic: %f' % adfuller_result[0])
print('p-value: %f' % adfuller_result[1])
print('Critical Values:')
for key, value in adfuller_result[4].items( ):
    print('\t%s: %.3f' % (key, value))
```

In the above example, the adfuller may output augmented Dickey-Fuller statistics and a p-value. If the augmented Dickey-Fuller statistics are greater than a predetermined percentage (e.g., one percent) of critical values or if the p-value is greater than a threshold value (e.g., 0.05), the testing system may determine that the time series data is not stationary. To ensure that the test data is nonlinear and not stationary, the above augmented Dickey-Fuller analysis may be performed on a log transform of the time series data. If the testing system determines that the test data validates the machine learning model better than the training data (e.g., by utilizing statistical learning, a MAPE of data snippets, and outlier detection), the testing system may identify a segment of the test data that validates the machine learning model better than the training data.

In some implementations, the testing system may calculate the test data scores based on whether the quantity of the test data is greater than the quantity of the training data, whether the test data includes stagnant data, whether the test data includes data spikes, whether the augmented Dickey-Fuller model indicates that the test data includes stationary time series data, and/or the like. For example, the testing system may calculate lower test data scores when the quantity of the test data is less than the quantity of the training data, when the test data includes stagnant data, when the test data fails to include data spikes, when the augmented Dickey-Fuller model indicates that the test data includes stationary time series data, and/or the like. In another example, the testing system may calculate higher test data scores when the quantity of the test data is greater than the quantity of the training data, when the test data fails to include stagnant data, when the test data includes data spikes, when the augmented Dickey-Fuller model indicates that the test data fails to include stationary time series data, and/or the like.

As further shown in FIG. 1G, and by reference number 150, the testing system may update the training data with the test data based on the test data scores satisfying a score threshold. For example, the testing system may determine whether the test data scores satisfy the score threshold. In some implementations, the testing system may determine that the test data scores satisfy the score threshold, and may update the training data with the test data based on determining that the test data scores satisfy the score threshold. The testing system may update the training data with the test data since the test data may improve the training data based on the test data scores satisfying the score threshold.

Figure 1H:
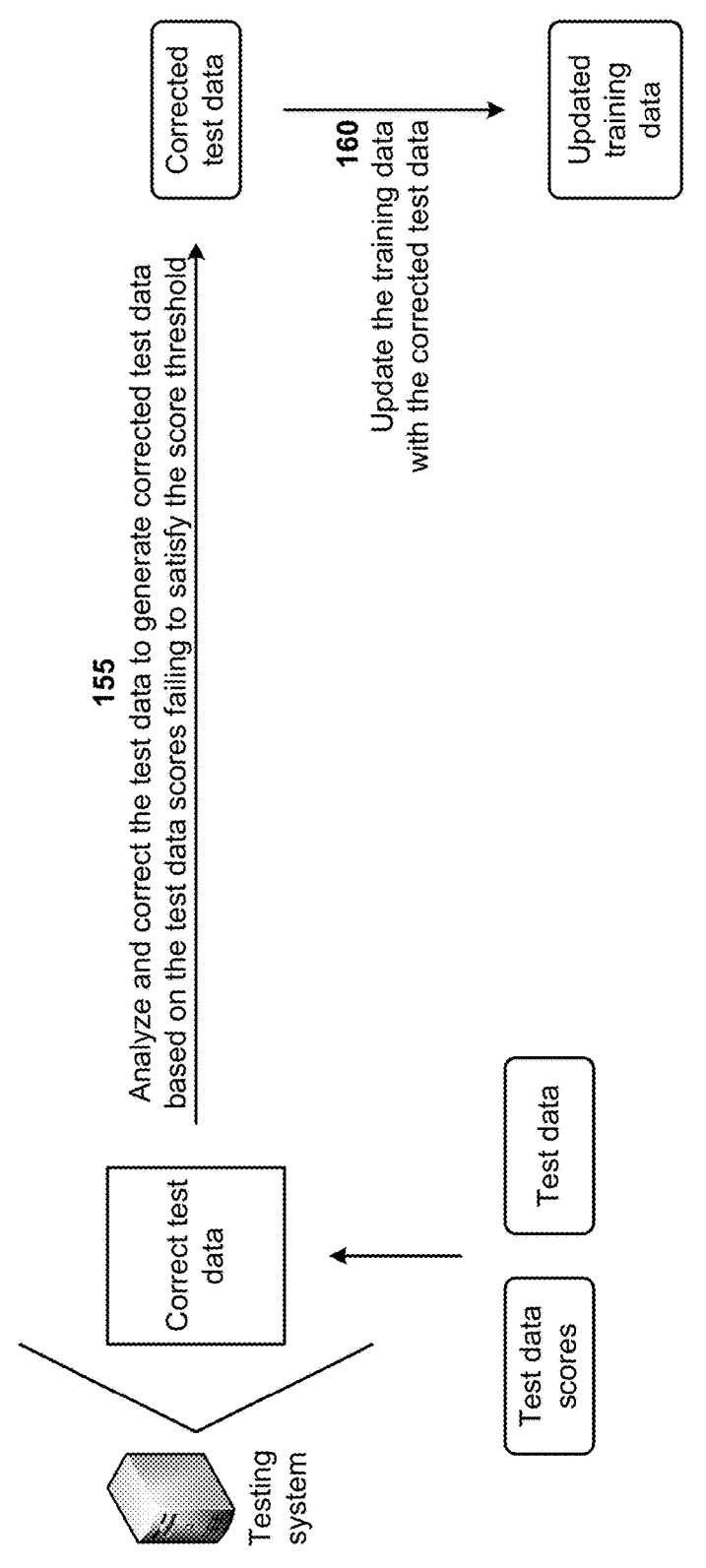

As shown in FIG. 1H, and by reference number 155, the testing system may analyze and correct the test data to generate corrected test data based on the test data scores failing to satisfy the score threshold. For example, the testing system may determine that the test data scores fail to satisfy the score threshold, and may determine that the test data needs be corrected based on determining that the test data scores fail to satisfy the score threshold. The testing system may correct the test data to generate the corrected test data and so that the test data scores satisfy the score threshold. In some implementations, the testing system may correct the test data until the test data scores satisfy the score threshold.

As further shown in FIG. 1H, and by reference number 160, the testing system may update the training data with the corrected test data. For example, the testing system may update the training data with the corrected test data after correcting the test data and generating the corrected test data. The testing system may update the training data with the corrected test data since the corrected test data may improve the training data based on the test data scores satisfying the score threshold. In some implementations, once the test data is validated or the corrected test data is generated, and the training data is updated, the testing system may train the updated machine learning model with the updated training data, and may test the updated machine learning model with the test data or the corrected test data.

Figure 1I:
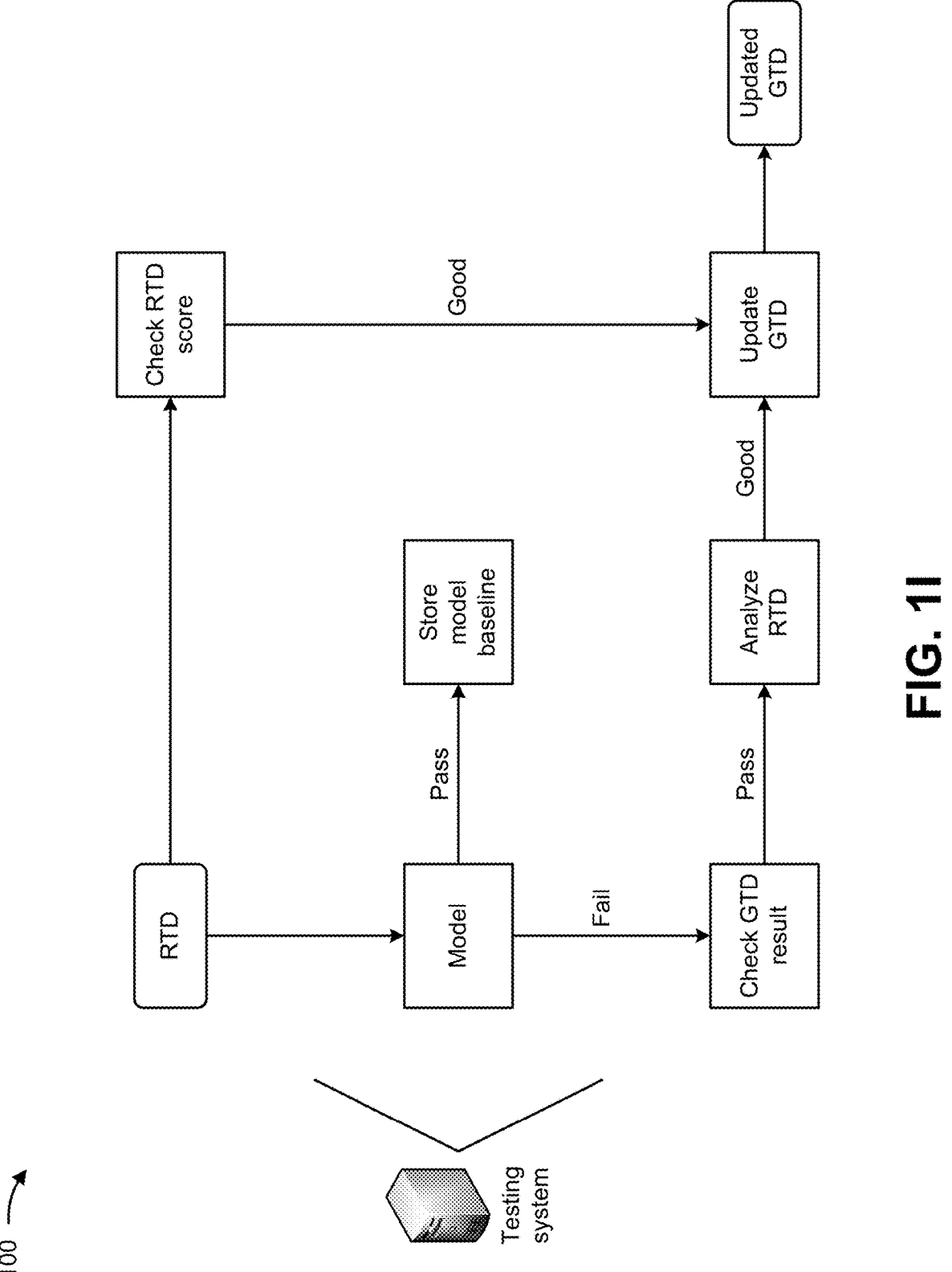

FIG. 1I depicts example steps associated with updating golden test data (GTD) (e.g., the historical validated test data) based on the real time data (RTD). As shown, the testing system may update the machine learning model with the real time data and may calculate scores for the real time data. If the machine learning model performs worse than a previous version of the machine learning model, the testing system may validate performance of the machine learning model with the golden test data. If the performance of the machine learning model is not deteriorated based on the validation with the golden test data, the testing system may analyze the real time data. If the analysis of the real time data is good (e.g., satisfies a threshold level) or the scores for the real time data are good (e.g., satisfy a threshold level), the testing system may update the gold test data with the real time data.

In this way, the testing system may test and baseline a machine learning model and test data. For example, the testing system may consider variances of input data for the machine learning model to ensure that an updated machine learning model functions correctly. The testing system may utilize various metrics and a testing approach that relies on the metrics to validate an efficiency of the updated machine learning model compared to a prior version of the machine learning model. The testing system may also score test data, utilized to test and train the updated machine learning model, to ensure that the test data is correct. Thus, the testing system conserves computing resources, networking resources, and/or the like that would otherwise have been consumed by incorrectly training and testing an incorrect machine learning model, utilizing incorrect test data when testing a machine learning model, generating an incorrect machine learning model based on incorrectly testing the machine learning model, generating incorrect predictions with the incorrect machine learning model and performing actions based on the incorrect predictions, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
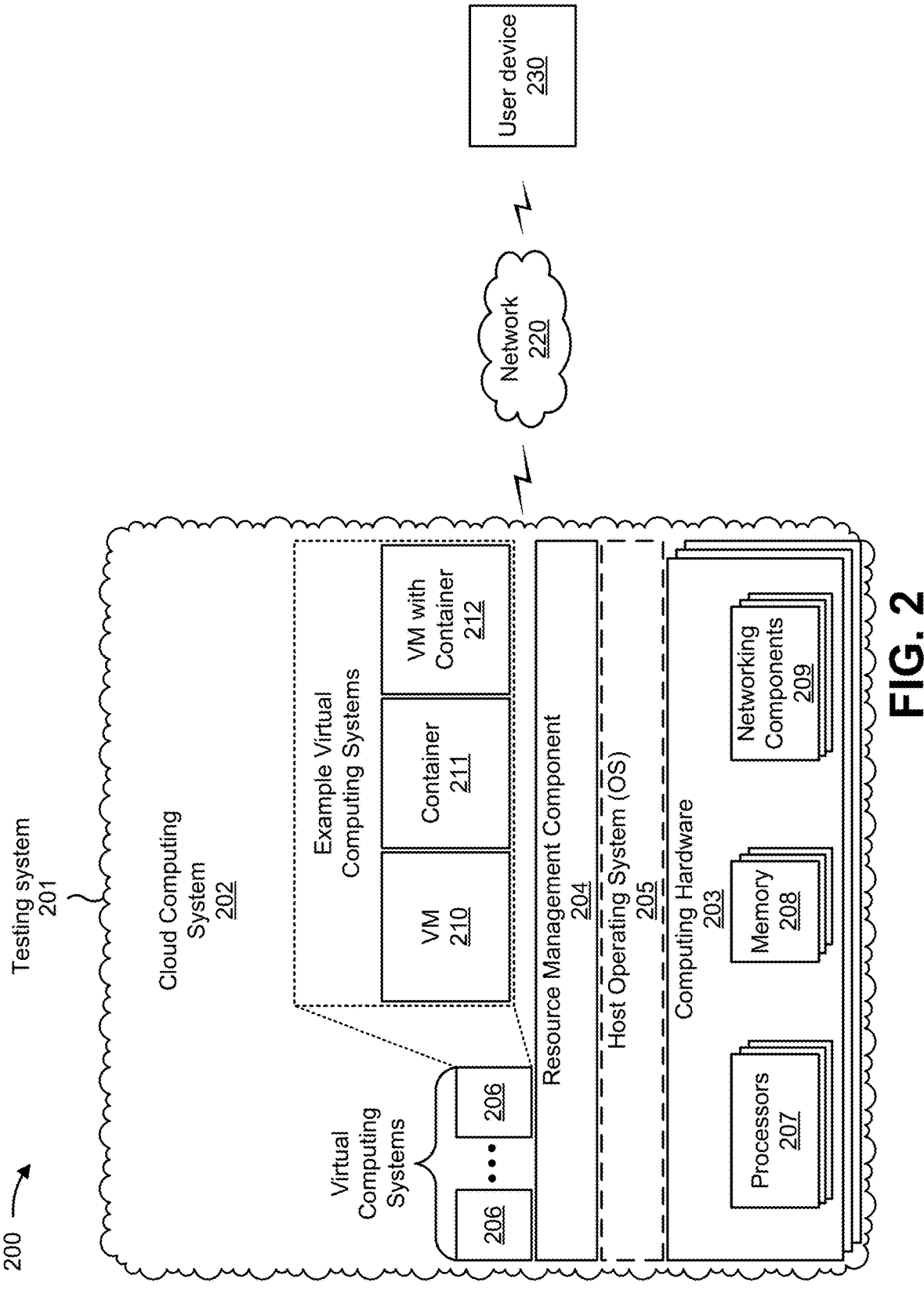
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a testing system 201, which may include one or more elements of and/or may execute within a cloud computing system 202. The cloud computing system 202 may include one or more elements 203-212, as described in more detail below. As further shown in FIG. 2, environment 200 may include a network 220 and/or a user device 230. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the testing system 201 may include one or more elements 203-212 of the cloud computing system 202, may execute within the cloud computing system 202, and/or may be hosted within the cloud computing system 202, in some implementations, the testing system 201 may not be cloud-based (e.g., may be implemented outside of a cloud computing system) or may be partially cloud-based. For example, the testing system 201 may include one or more devices that are not part of the cloud computing system 202, such as device 300 of FIG. 3, which may include a stand-alone server or another type of computing device. The testing system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The user device 230 includes one or more devices capable of receiving, generating, storing, processing, and/or providing information, as described elsewhere herein. The user device 230 may include a communication device. For example, the user device 230 may include a wireless communication device, a mobile phone, a laptop computer, a tablet computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
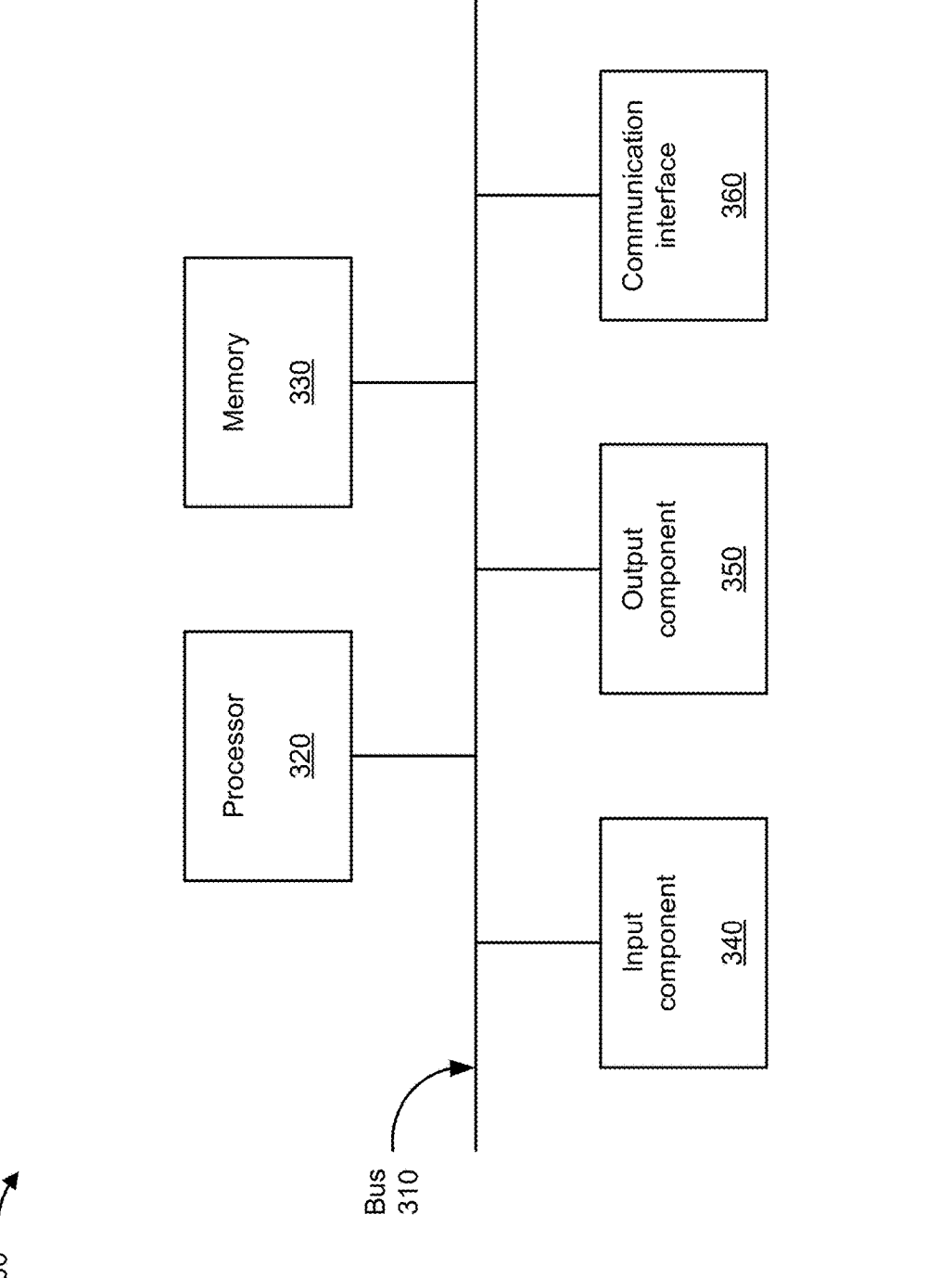
FIG. 3 is a diagram of example components of one or more devices of FIG. 2.

FIG. 3 is a diagram of example components of one or more devices of FIG. 2. The example components may be included in a device 300, which may correspond to the testing system 201 and/or the user device 230. In some implementations, the testing system 201 and/or the user device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for testing and baselining a machine learning model and test data. In some implementations, one or more process blocks of FIG. 4 may be performed by a device (e.g., the testing system 201). In some implementations, one or more process blocks of FIG. 4 may be performed by another device or a group of devices separate from or including the device, such as a user device (e.g., the user device 230). Additionally, or alternatively, one or more process blocks of FIG. 4 may be performed by one or more components of the device 300, such as the processor 320, the memory 330, the input component 340, the output component 350, and/or the communication interface 360.

As shown in FIG. 4, process 400 may include receiving a machine learning model, historical validated test data, and real time data (block 410). For example, the device may receive a machine learning model, historical validated test data, and real time data, as described above.

As further shown in FIG. 4, process 400 may include storing the historical validated test data as training data and the real time data as test data (block 420). For example, the device may store the historical validated test data as training data and the real time data as test data, as described above.

As further shown in FIG. 4, process 400 may include performing a unit test on the machine learning model to generate unit test results (block 430). For example, the device may perform a unit test on the machine learning model to generate unit test results, as described above. In some implementations, the unit test results provide an indication of a line coverage of the machine learning model.

As further shown in FIG. 4, process 400 may include performing regression tests on the machine learning model, with the training data and the test data, to calculate model scores, create graphs, determine inference delays, and identify missing points for the machine learning model (block 440). For example, the device may perform regression tests on the machine learning model, with the training data and the test data, to calculate model scores, create graphs, determine inference delays, and identify missing points for the machine learning model, as described above. In some implementations, performing the regression tests on the machine learning model, with the training data and the test data, to calculate the model scores, includes calculating a mean absolute percentage error as one of the model scores, and calculating a symmetric mean absolute percentage error as one of the model scores. In some implementations, performing the regression tests on the machine learning model, with the training data and the test data, to create the graphs includes creating a graph associated with values predicted by the machine learning model and actual values. In some implementations, the inference delays indicate time periods required for the machine learning model to generate inferences. In some implementations, the missing points indicate a quantity of inferences that the machine learning model failed to generate.

As further shown in FIG. 4, process 400 may include performing scale and longevity tests on the machine learning model, with the training data and the test data, to identify additional missing points and calculate a resource utilization for the machine learning model (block 450). For example, the device may perform scale and longevity tests on the machine learning model, with the training data and the test data, to identify additional missing points and calculate a resource utilization for the machine learning model, as described above. In some implementations, the resource utilization provides an indication of a processor utilization and a memory utilization when the machine learning model is executed.

As further shown in FIG. 4, process 400 may include updating the machine learning model, to generate an updated machine learning model, based on one or more of the unit test results, the model scores, the graphs, the inference delays, the missing points, the additional missing points, or the resource utilization (block 460). For example, the device may update the machine learning model, to generate an updated machine learning model, based on one or more of the unit test results, the model scores, the graphs, the inference delays, the missing points, the additional missing points, or the resource utilization, as described above.

In some implementations, process 400 includes processing the training data, with a static analysis model, to identify miscoding errors and outliers, and correcting the training data to eliminate the miscoding errors and the outliers. In some implementations, the static analysis model is a lint model.

In some implementations, process 400 includes calculating test data scores for the test data based on parameters and properties associated with the training data and the test data, and updating the training data with the test data based on the test data scores satisfying a score threshold. In some implementations, the parameters and the properties include one or more of a comparison of a quantity of the training data and a quantity of the test data, whether the test data includes stagnant data, whether the test data is associated with a data spike, or results of an augmented Dickey-Fuller test performed on the test data. In some implementations, process 400 includes correcting the test data to generate corrected test data based on the test data scores failing to satisfy the score threshold, and updating the training data with the corrected test data.

In some implementations, process 400 includes training the updated machine learning model with the training data, and testing the updated machine learning model with the test data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, a machine learning model, historical validated test data, and real time data;
   storing, by the device, the historical validated test data as training data and the real time data as test data;
   performing, by the device, a unit test on the machine learning model to generate unit test results,
      wherein the unit test results include data identifying one or more of:
         that the machine learning model passed the unit test,
         that the machine learning model failed the unit test,
         errors or bugs in the machine learning model, or
         a location of a fault or a failure in the machine learning model;
   performing, by the device, regression tests on the machine learning model, with the training data and the test data, to calculate model scores, create graphs, determine inference delays, and identify missing points for the machine learning model;
   performing, by the device, scale and longevity tests on the machine learning model, with the training data and the test data, to identify additional missing points and calculate a resource utilization for the machine learning model;
   updating, by the device, the machine learning model, to generate an updated machine learning model, based on one or more of the unit test results to correct the errors, bugs, faults, or failures in the machine learning model, the model scores, the graphs, the inference delays, the missing points to reduce a quantity of the missing points to zero, the additional missing points to reduce a quantity of the additional missing points to zero, or the resource utilization;
   correcting, by the device, the test data to generate corrected test data;
   updating, by the device, the training data with the corrected test data to generate updated training data; and
   training, by the device, the updated machine learning model with the updated training data.

2. The method of claim 1, wherein updating the training data comprises:
   processing the training data, with a static analysis model, to identify miscoding errors and outliers; and
   correcting the training data to eliminate the miscoding errors and the outliers.

3. The method of claim 2,
   wherein the static analysis model is a lint model.

4. The method of claim 1, wherein correcting the test data comprises:
   calculating test data scores for the test data based on parameters and properties associated with the training data and the test data.

5. The method of claim 4, wherein the parameters and the properties include one or more of:

a comparison of a quantity of the training data and a quantity of the test data, whether the test data includes stagnant data, whether the test data is associated with a data spike, or results of an augmented Dickey-Fuller test performed on the test data.

6. The method of claim 1, wherein the unit test results provide an indication of a line coverage of the machine learning model.

7. The method of claim 1, wherein the inference delays indicate time periods required for the machine learning model to generate inferences, and wherein the missing points of the machine learning model indicate a quantity of inferences that the machine learning model failed to generate.

8. A device, comprising:

one or more memories; and one or more processors to:

receive a machine learning model, historical validated test data, and real time data;

store the historical validated test data as training data and the real time data as test data;

perform a unit test on the machine learning model to generate unit test results, wherein the unit test results include data identifying one or more of:

that the machine learning model passed the unit test, that the machine learning model failed the unit test, errors or bugs in the machine learning model, or a location of a fault or a failure in the machine learning model;

perform regression tests on the machine learning model, with the training data and the test data, to calculate model scores, create graphs, determine inference delays, and identify missing points for the machine learning model;

perform scale and longevity tests on the machine learning model, with the training data and the test data, to identify additional missing points and calculate a resource utilization for the machine learning model;

update the machine learning model, to generate an updated machine learning model, based on one or more of: the unit test results to correct the errors, bugs, faults, or failures in the machine learning model, the model scores, the graphs, the inference delays, the missing points to reduce a quantity of the missing points to zero, the additional missing points to reduce a quantity of the additional missing points to zero, or the resource utilization;

calculate test data scores for the test data based on parameters and properties associated with the training data and the test data;

update the training data with the test data to generate updated training data based on the test data scores satisfying a score threshold; and train the updated machine learning model with the updated training data.

9. The device of claim 8, wherein the one or more processors, to perform the regression tests on the machine learning model, with the training data and the test data, to calculate the model scores, are to:

calculate a mean absolute percentage error as one of the model scores; and calculate a symmetric mean absolute percentage error as one of the model scores.

10. The device of claim 8, wherein the one or more processors, to perform the regression tests on the machine learning model, with the training data and the test data, to create the graphs, are to:

create a graph associated with values predicted by the machine learning model and actual values.

11. The device of claim 8, wherein the inference delays indicate time periods required for the machine learning model to generate inferences.

12. The device of claim 8, wherein the missing points indicate a quantity of inferences that the machine learning model failed to generate.

13. The device of claim 8, wherein the resource utilization provides an indication of a processor utilization and a memory utilization when the machine learning model is executed.

14. The device of claim 8, wherein the one or more processors are further to:

test the updated machine learning model with the test data.

15. A non-transitory computer-readable medium storing a set of instructions, the set of instructions comprising:

one or more instructions that, when executed by one or more processors of a device, cause the device to:

receive a machine learning model, historical validated test data, and real time data;

store the historical validated test data as training data and the real time data as test data;

perform a unit test on the machine learning model to generate unit test results, wherein the unit test results include data identifying one or more of:

that the machine learning model passed the unit test, that the machine learning model failed the unit test, errors or bugs in the machine learning model, or a location of a fault or a failure in the machine learning model;

perform regression tests on the machine learning model, with the training data and the test data, to calculate model scores, create graphs, determine inference delays, and identify missing points for the machine learning model;

perform scale and longevity tests on the machine learning model, with the training data and the test data, to identify additional missing points and calculate a resource utilization for the machine learning model;

update the machine learning model, to generate an updated machine learning model, based on one or more of: the unit test results to correct the errors, bugs, faults, or failures in the machine learning model, the model scores, the graphs, the inference delays, the missing points to reduce a quantity of the missing points to zero, the additional missing points to reduce a quantity of the additional missing points to zero, or the resource utilization;

process the training data, with a static analysis model, to identify miscoding errors and outliers;

correct the training data to eliminate the miscoding errors and the outliers to generate updated training data;

correct the test data to generate updated test data;

update the training data with the updated test data to generate the updated training data; and train the updated machine learning model with the updated training data.

16. The non-transitory computer-readable medium of claim 15, wherein the one or more instructions, that cause the device to correct the test data, cause the device to:

calculate test data scores for the test data based on parameters and properties associated with the training data and the test data.

17. The non-transitory computer-readable medium of claim 16, wherein the one or more instructions, that cause the device to correct the test data, cause the device to:

correct the test data to generate the updated test data based on the test data scores failing to satisfy a score threshold.

18. The non-transitory computer-readable medium of claim 15, wherein the one or more instructions, that cause the device to perform the regression tests on the machine learning model, with the training data and the test data, to calculate the model scores, cause the device to:

calculate a mean absolute percentage error as one of the model scores; and calculate a symmetric mean absolute percentage error as one of the model scores.

19. The non-transitory computer-readable medium of claim 15, wherein the one or more instructions, that cause the device to perform the regression tests on the machine learning model, with the training data and the test data, to create the graphs, cause the device to:

create a graph associated with values predicted by the machine learning model and actual values.

20. The non-transitory computer-readable medium of claim 15, wherein the one or more instructions further cause the device to:

test the updated machine learning model with the updated test data.

* * * * *